(12) United States Patent
El-Hassan et al.

(10) Patent No.: US 8,805,306 B2
(45) Date of Patent: Aug. 12, 2014

(54) METHOD FOR DETERMINING OPTIMUM POWER AMPLIFIER CONFIGURATIONS USING LIST MODE TESTING

(75) Inventors: Wassim El-Hassan, Cupertino, CA (US); David A. Donovan, Oakland, CA (US)

(73) Assignee: Apple Inc., Cupertino, CA (US)

( * ) Notice: Subject to any disclaimer, the term of this patent is extended or adjusted under 35 U.S.C. 154(b) by 6 days.

(21) Appl. No.: 13/606,588

(22) Filed: Sep. 7, 2012

(65) Prior Publication Data

US 2014/0073275 A1    Mar. 13, 2014

(51) Int. Cl.
*H03C 1/62* (2006.01)
*H04W 24/00* (2009.01)

(52) U.S. Cl.
USPC .................................. 455/115.1; 455/67.11

(58) Field of Classification Search
USPC ........ 455/67.11–67.7, 115.1–115.4, 423–425
See application file for complete search history.

(56) References Cited

U.S. PATENT DOCUMENTS

| | | | |
|---|---|---|---|
| 2009/0298440 A1* | 12/2009 | Takeya et al. | 455/67.14 |
| 2010/0112967 A1* | 5/2010 | Sorensen | 455/127.2 |
| 2011/0095778 A1 | 4/2011 | Chou et al. | |
| 2011/0099424 A1 | 4/2011 | Rivera Trevino et al. | |
| 2011/0119016 A1 | 5/2011 | Patel et al. | |
| 2012/0191400 A1 | 7/2012 | Sontakke et al. | |

* cited by examiner

*Primary Examiner* — Lee Nguyen
(74) *Attorney, Agent, or Firm* — Treyz Law Group; Michael H. Lyons

(57) ABSTRACT

A calibration system for calibrating wireless circuitry in an electronic device is provided. The test system may include test equipment, a computer, and a device under test (DUT). The test equipment may measure the output power of the DUT. The DUT may include power amplifier circuitry that is provided with a power supply voltage supplied by power supply circuitry. A list mode sequence of commands may be provided to the DUT and the test equipment to calibrate the power amplifier circuitry. The list of commands may be processed by the DUT to produce radio-frequency signals. The list of commands may be simultaneously processed by the test equipment to perform measurements on the radio-frequency signals. The computer may retrieve measurement data from the test equipment after testing is complete. The computer may subsequently determine calibrated control settings for the DUT that reduce power consumption while ensuring satisfactory adjacent channel leakage performance.

27 Claims, 11 Drawing Sheets

| OUTPUT POWER | $V_{DD}$ | RGI | GAIN MODE | FREQUENCY CHANNEL | TEST TIME |
|---|---|---|---|---|---|
| $P_1$ | $V_{DD1}$ | $RGI_1$ | HG | C3 | $\Delta T_A$ |
| $P_1$ | $V_{DD2}$ | $RGI_1$ | HG | C3 | $\Delta T_A$ |
| ... | ... | ... | ... | ... | ... |
| $P_1$ | $V_{DDN}$ | $RGI_1$ | HG | C3 | $\Delta T_A$ |
| $P_2$ | $V_{DD1}$ | $RGI_2$ | HG | C3 | $\Delta T_A$ |
| $P_2$ | $V_{DD2}$ | $RGI_1$ | HG | C3 | $\Delta T_A$ |
| ... | ... | ... | ... | ... | ... |
| $P_3$ | $V_{DD1}$ | $RGI_3$ | LG | C3 | $\Delta T_A$ |
| ... | ... | ... | ... | ... | ... |

LIST MODE SEQUENCE

FIG. 5

METHOD FOR DETERMINING OPTIMUM POWER AMPLIFIER CONFIGURATIONS USING LIST MODE TESTING

BACKGROUND

This invention relates generally to electronic devices having wireless communications circuitry, and more particularly, to calibrating wireless communications circuitry in electronic devices.

Electronic devices wirelessly communicate in frequency ranges that are sometimes referred to as frequency bands. The frequency bands are partitioned into frequency channels. Electronic devices often have wireless communications circuitry that includes radio-frequency power amplifiers. Radio-frequency power amplifiers are used to amplify radio-frequency signals for wireless transmission in a desired channel.

Radio-frequency power amplifiers typically exhibit reduced power consumption at lower supply voltages. Lowering the supply voltage that biases the power amplifiers directly decreases the supply current that flows through the radio-frequency power amplifiers, thereby saving power. Lowering the supply voltage, however, degrades power amplifier linearity. Degrading power amplifier linearity in this way may undesirably increase adjacent channel leakage ratio (e.g., the ratio of out-of-channel power to in-channel power). Radio-frequency power amplifiers can be calibrated to determine the optimum supply voltages for use during normal operation.

Radio-frequency power amplifiers can be calibrated using test equipment. During conventional testing operations, the test equipment configures electronic device settings to desired values during a setup phase and subsequently performs tests on the electronic device during a testing phase. Additional electronic device settings require additional setup phase time. Performing tests at multiple electronic device settings can be time consuming and lead to high manufacturing costs.

It would therefore be desirable to be able to provide improved testing systems for electronic devices.

SUMMARY

Electronic devices may include wireless communications circuitry, storage and processing circuitry, battery circuitry, and input and output circuitry. The wireless communications circuitry may include radio-frequency power amplifier circuitry, radio-frequency transceiver circuitry, baseband circuitry, and adjustable power supply circuitry.

The radio-frequency transceiver circuitry may feed signals to the power amplifier circuitry. The power amplifier circuitry may amplify the signals prior to wireless transmission. The storage and processing circuitry may bias the power amplifier circuitry at a desired positive power supply voltage. Adjustments to amplifier bias may be made to ensure adequate performance while minimizing power consumption.

An electronic device may wirelessly communicate in frequency ranges that are sometimes referred to as frequency bands. The frequency bands may be partitioned into frequency channels. The performance of the power amplifier circuitry may be characterized by a metric such as an adjacent channel leakage ratio (ACLR). The adjacent channel leakage ratio in a system is defined as the ratio of out-of-channel power in an adjacent channel to in-channel power. A small adjacent channel leakage ratio value is indicative of good amplifier linearity. Electronic devices that include wireless communications circuitry may be subject to ACLR requirements that require the wireless communication circuitry to maintain adjacent channel leakage ratio values below a predetermined threshold.

The electronic device may be tested at a number of desired output power levels within a selected channel to determine calibration settings for the wireless communications circuitry. The calibration settings may include power supply voltage settings for the power amplifier, power amplifier gain settings, and baseband circuitry settings such as digital-to-analog (DAC) values.

Test equipment may be used to test the electronic device. Computing equipment may provide a sequence of commands to the electronic device under test and the test equipment. The sequence of commands may be a list of configurations or control settings for the wireless communications circuitry in the electronic device under test (e.g., a desired gain mode, output power level, power supply voltage level, frequency band, etc.). Each command of the sequence may identify for how long the corresponding configuration is to be tested.

The electronic device under test and the test equipment may receive the sequence of commands (sometimes referred to as a list of instructions or an instruction list) prior to beginning test measurements. Each instruction of the list of instructions may include control settings for the electronic device. For example, each instruction may include a power supply voltage setting, desired output power level, gain mode, radio-frequency gain index (RGI), frequency channel, or other control settings (e.g., control settings for wireless communications circuitry in the electronic device). In response to instructions from the computing equipment to begin testing, the device under test may process the list of instructions to transmit radio-frequency signals based on the control settings of each instruction in the list of instructions (e.g., each entry in the list of instructions).

The test equipment may include measuring equipment that is configured to measure the output power level of radio-frequency signals transmitted by the device using the configurations identified by the sequence of commands. The measurement equipment may measure a first output power level of the signals transmitted by the electronic device under test at a frequency channel identified by the list of instructions. The measurement equipment may also measure a second output power level at adjacent frequency channels.

The computing equipment may direct the electronic device under test to process the instructions in the list of instructions in sequential order. The computing equipment may instruct the test equipment to begin measuring the radio-frequency output power levels upon receipt of radio-frequency signals from the electronic device that are associated with an initial instruction of the instruction list. The test equipment may also include storage circuitry. The test equipment may store measured data in the storage circuitry.

For example, the computing equipment may determine whether the radio-frequency output power level measurements have been performed for each entry in the list of instructions. After each configuration identified in the sequence of commands has been processed, the computing equipment may retrieve the measurement data from the test equipment in response to determining that the radio-frequency output power level measurements have been performed by the test equipment for each entry in the list of instructions.

The computing equipment may process the measured data to generate calibration settings for the wireless communications circuitry. The computing equipment may select a desired frequency channel and a desired output power for calibration. The computing equipment may compare measured output powers in frequency channels that are adjacent to the desired frequency channel to adjacent channel leakage ratio requirements (e.g., a maximum threshold output power defined by ACLR requirements) in order to identify a minimal power supply voltage while ensuring satisfactory ACLR performance. These steps may be repeated to calibrate multiple different output power levels. The identified power supply voltages may be stored in the electronic device as calibration data for use during normal operation of the electronic device.

Further features of the present invention, its nature and various advantages will be more apparent from the accompanying drawings and the following detailed description.

BRIEF DESCRIPTION OF THE DRAWINGS

FIG. 5 is an illustrative diagram of a sequence of commands that may be provided by computing equipment to an electronic device under test and test equipment to perform radio-frequency test operations in accordance with an embodiment of the present invention.

DETAILED DESCRIPTION

The present invention relates generally to electronic device calibration, and more particularly, to calibrating wireless electronic devices having wireless communications circuitry using test equipment.

The wireless electronic devices may include, for example, portable electronic devices such as laptop computers, tablet computers, or small portable computers of the type that are sometimes referred to as ultraportables. Portable electronic devices may also be somewhat smaller devices. The wireless electronic devices may also be, for example, cellular telephones, media players with wireless communications capabilities, handheld computers (also sometimes called personal digital assistants), remote controllers, global positioning system (GPS) devices, and handheld gaming devices. Wireless electronic devices such as these may perform multiple functions. For example, a cellular telephone may include media player functionality and may have the ability to run games, email applications, web browsing applications, and other software.

In devices such as these, radio-frequency signals are typically amplified using power amplifier circuitry. For example, the power amplifier circuitry may be used to boost radio-frequency signals prior to transmission over an antenna. The power radio-frequency power amplifier circuitry that is used in amplifying transmitted radio-frequency signals may output signals with desired output power levels. The radio-frequency power amplifier circuitry may be adjustable. For example, the power amplifier circuitry may be configured to operate at a low gain mode when amplifying radio-frequency signals with low output power levels and at a high gain mode when amplifying radio-frequency signals with high output power levels. The power amplifier circuitry may also be provided with an adjustable supply voltage bias (e.g., an adjustable power supply voltage).

Figure 1:
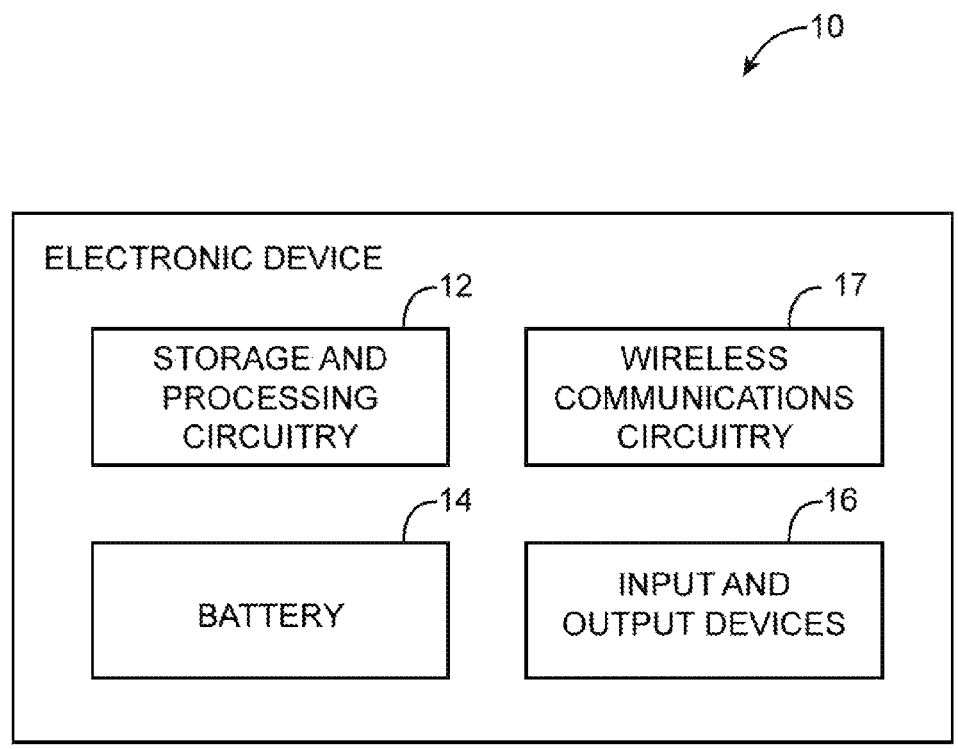
FIG. 1 is a diagram of an illustrative electronic device with wireless communications circuitry that can be provided with a list of test commands in accordance with an embodiment of the present invention.

A diagram of an illustrative electronic device such as a handheld electronic device or other portable electronic device is shown in FIG. 1. Device 10 of FIG. 1 may be a mobile telephone, a mobile telephone with media player capabilities, a handheld computer, a remote control, a game player, a global positioning system (GPS) device, a laptop computer, a tablet computer, an ultraportable computer, a device with the capacity to perform the functions of one or more of such devices, or any other suitable portable electronic device.

As shown in FIG. 1, device 10 may include storage and processing circuitry 12. Storage and processing circuitry 12 may include one or more different types of storage such as hard disk drive storage, nonvolatile memory (e.g., flash memory or other electrically-programmable-read-only memory), volatile memory (e.g., static or dynamic random-access-memory), etc. Storage and processing circuitry 12 may be used in controlling the operation of device 10. Processing circuitry in circuitry 12 may be based on processors such as microprocessors, microcontrollers, digital signal processors, dedicated processing circuits, power management circuits, audio and video chips, radio-frequency transceiver processing circuits, radio-frequency integrated circuits of the type that are sometimes referred to as baseband modules, and other suitable integrated circuits.

With one suitable arrangement, storage and processing circuitry 12 may be used to run software on device 10, such as internet browsing applications, voice-over-internet-protocol (VOIP) telephone call applications, email applications, media playback applications, operating system functions, etc. Storage and processing circuitry 12 may be used in implementing suitable communications protocols. Communications protocols that may be implemented using storage and processing circuitry 12 include internet protocols, wireless local area network protocols (e.g., IEEE 802.11 protocols that are sometimes referred to as Wi-Fi®), protocols for other short-range wireless communications links such as the Bluetooth® protocol, protocols for handling 2G cellular telephone communications services, 3 G communications protocols such as high-speed uplink packet access (HSUPA) protocols, Long-Term-Evolution (LTE) protocols, etc.

Device 10 may have one or more batteries such as battery 14. To minimize power consumption and thereby extend the life of battery 14, storage and processing circuitry 12 may be used in implementing power management functions for device 10. For example, storage and processing circuitry 12 may be used to adjust radio-frequency power amplifier circuitry on device 10 and may be used in adjusting input power levels provided to the input of radio-frequency power amplifier circuitry on device 10 from a transceiver circuit. Power amplifier adjustments that may be made include gain setting adjustments and power supply voltage adjustments (also sometimes referred to as bias voltage adjustments). These adjustments may be made automatically in real time based on tables of preferred control settings for various different operating conditions. Power amplifier adjustments may be made based on calibration results during manufacturing. For example, each electronic device may be calibrated during manufacturing to determine optimum control settings that accommodate manufacturing variances associated with that electronic device.

Input-output devices 16 may be used to allow data to be supplied to device 10 and to allow data to be provided from device 10 to external devices. Examples of input-output devices 16 that may be used in device 10 include display screens such as touch screens (e.g., liquid crystal displays or organic light-emitting diode displays), buttons, joysticks, click wheels, scrolling wheels, touch pads, key pads, keyboards, microphones, speakers and other devices for creating sound, cameras, sensors, etc. A user can control the operation of device 10 by supplying commands through devices 16. Devices 16 may also be used to convey visual or sonic information to the user of device 10. Devices 16 may include connectors for forming data ports (e.g., for attaching external equipment such as computers, accessories, etc.).

Wireless communications circuitry 17 may include communications circuitry such as radio-frequency (RF) transceiver circuitry formed from one or more integrated circuits, power amplifier circuitry (e.g., power amplifier circuitry that is controlled by control signals from storage and processing circuitry 14 to minimize power consumption while satisfying desired performance criteria, passive RF components, antennas, and other circuitry for handling RF wireless signals. Wireless signals can also be sent using light (e.g., using infrared communications).

Device 10 can communicate with external devices such as accessories, computing equipment, and wireless networks over wired and wireless communications paths. For example, accessories such as wired or wireless headsets may communicate with device 10. Device 10 may also be connected to audio-video equipment (e.g., wireless speakers, a game controller, or other equipment that receives and plays audio and video content) or a peripheral such as a wireless printer or camera.

Device 10 may use a wired or wireless path to communicate with a personal computer, test equipment, or other computing equipment. The computing equipment may be, for example, a computer that has an associated wireless access point (router) or an internal or external wireless card that establishes a wireless connection with device 10. The computer may be a server (e.g., an internet server), a local area network computer with or without internet access, a user's own personal computer, a peer device (e.g., another portable electronic device 10), or any other suitable computing equipment.

Device 10 can also communicate with wireless network equipment, such as cellular telephone base stations, wireless data networks, computers associated with wireless networks, etc. Such wireless networks may include network management equipment that monitors the wireless signal strength of the wireless handsets such as device 10 that are in communication with the network. To improve the overall performance of the network and to ensure that interference between handsets is minimized, the network management equipment may send power adjustment commands (sometimes referred to as transmit power control commands or TCP commands) to each handset. The transmit power control settings that are provided to the handsets direct handsets with weak signals to increase their transmit powers, so that their signals will be properly received by the network. At the same time, the transmit power control settings may instruct handsets whose signals are being received clearly at high power to reduce their transmit power control settings. This reduces interference between handsets and allows the network to maximize its use of available wireless bandwidth.

When device 10 receives transmit power control settings from the network or at other suitable times, device 10 may make suitable transmission power adjustments. For example, device 10 may adjust the power level of signals that are provided by transceiver circuitry to radio-frequency power amplifiers on device 10 and may adjust the radio-frequency power amplifiers. Power amplifier adjustments such as these may include gain mode setting adjustments and power supply voltage adjustments.

The output signals from the power amplifiers on device 10 are wirelessly transmitted from device 10 to suitable receivers using antennas on devices 10. The settings for wireless communications circuitry 17 may include gain mode adjustments that control the gain settings of power amplifiers. For example, a gain mode adjustment may control whether a power amplifier is operating in a high gain mode or a low gain mode in which the power amplifier is configured to conserve power. Power supply voltage adjustments may be used to help minimize power consumption at a given gain setting. In typical circuit architectures, a transceiver circuit may supply radio-frequency signals to the input of a power amplifier for transmission through an antenna. The power at which the transceiver circuit outputs these radio-frequency signals establishes an input power level (sometimes referred to herein as $P_{IN}$) for the power amplifier. Input power adjustments (adjustments to $P_{IN}$) may be finely adjusted by adjusting a gain index of the transceiver circuitry. Input power adjustments can be made to adjust the power of radio-frequency signals transmitted by device 10.

The antenna structures and wireless communications devices of device 10 may support communications over any suitable wireless communications bands. For example, wireless communications circuitry 17 may be used to cover communications frequency bands such as cellular telephone voice and data bands at 850 MHz, 900 MHz, 1800 MHz, 1900 MHz, and the communications band at 2100 MHz band, the Wi-Fi® (IEEE 802.11) bands at 2.4 GHz and 5.0 GHz (also sometimes referred to as wireless local area network or WLAN bands), the Bluetooth® band at 2.4 GHz, and the global positioning system (GPS) band at 1550 MHz. A frequency band such as a code division multiple access (CDMA) frequency bands and 800 MHz and 1900 MHz may be partitioned into channels of smaller frequency ranges within the frequency band. This example is merely illustrative. Any desired communications frequency band may be partitioned into smaller frequency ranges that are sometimes referred to as channels or frequency channels.

Device 10 can cover these communications bands and other suitable communications bands with proper configuration of the antenna structures in wireless communications circuitry 17. Any suitable antenna structures may be used in device 10. For example, device 10 may have one antenna or may have multiple antennas. The antennas in device 10 may each be used to cover a single communications band or each antenna may cover multiple communications bands. If desired, one or more antennas may cover a single band while one or more additional antennas are each used to cover multiple bands.

Figure 2:
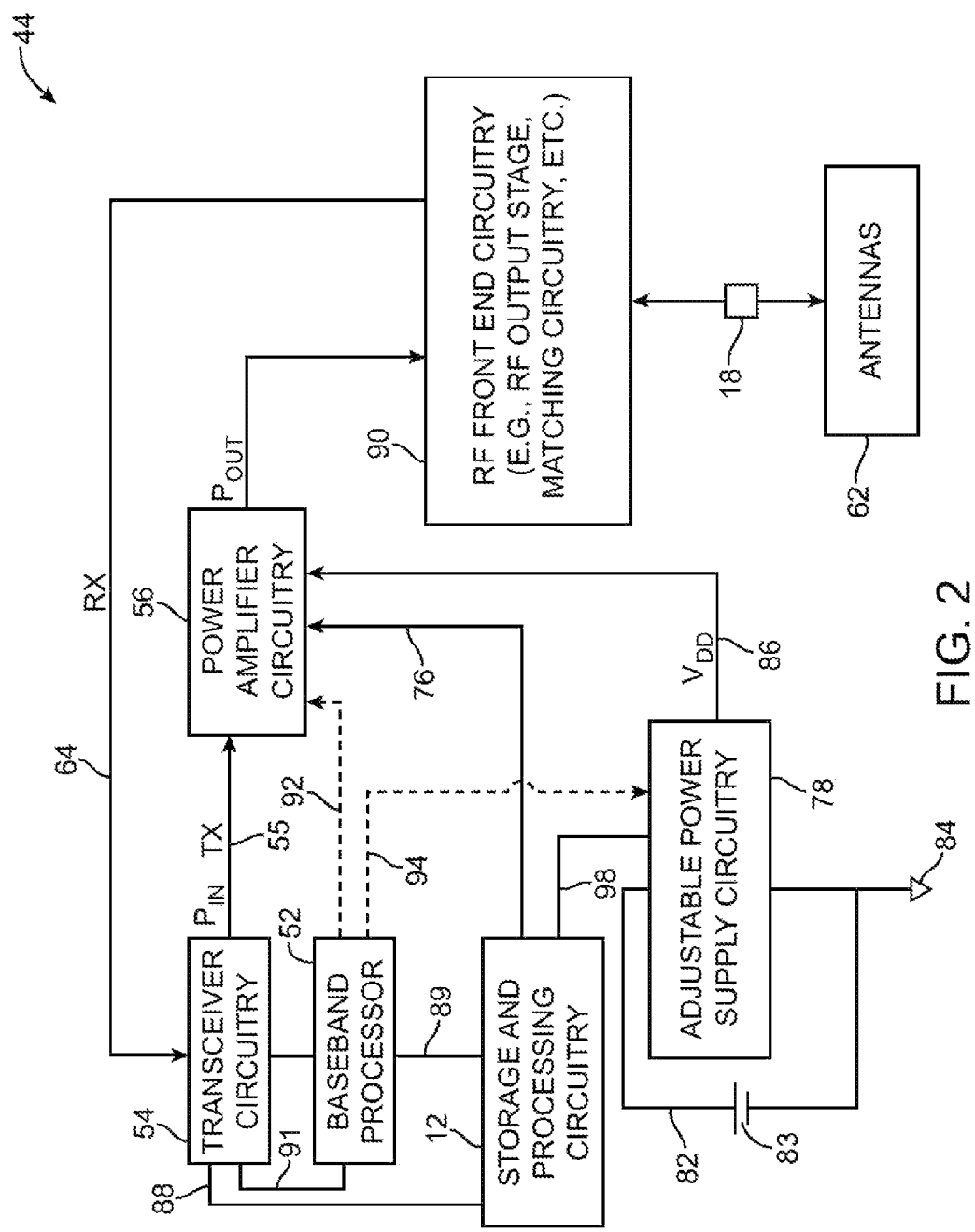
FIG. 2 is a circuit diagram of illustrative wireless communications circuitry that can be provided with a list of test commands in accordance with an embodiment of the present invention.

Illustrative wireless communications circuitry 44 that may be used in circuitry 17 of FIG. 1 in device 10 is shown in FIG. 2. As shown in FIG. 2, wireless communications circuitry 44 may include one or more antennas such as antennas 62 and may include radio-frequency front end circuitry 90. Front end circuitry 90 may include, for example, radio-frequency output stage circuitry and filter circuitry such as duplexers and diplexers. Front end circuitry 90 may also include a network of passive components such as resistors, inductors, and capacitors that helps to ensure that antenna structures 62 are impedance matched to the rest of the circuitry 44.

During signal transmission operations, circuitry 90 may supply radio-frequency signals that are transmitted by antennas 62. During signal reception operations, circuitry 90 may accept radio-frequency signals that have been received by antennas 62. Radio-frequency connector 18 may be coupled between frontend circuitry 90 and antennas 62. Connector 18 may be coupled to radio-frequency test equipment during testing such as radio-frequency testing of electronic device 10. For example, radio-frequency signals supplied by power amplifier circuitry 56 may be measured via connector 18. If desired, connector 18 may be omitted and radio-frequency signals may be measured indirectly (e.g., via over-the-air measurements of radio-frequency signals transmitted by antennas 62).

Circuitry 90 may include active components such as radio-frequency switches. The radio-frequency switches may, if desired, be used to switch circuitry 44 between a transmitting mode and a receiving mode (sometimes referred to as time division duplexing). Frontend circuitry 90 may be used to route transmit and receive signals based on frequency (e.g., frequency division duplexing). Radio-frequency signals that are received by antenna structures 62 may be passed to receiver circuitry in transceiver circuitry 54 over a path such as path 64.

Data signals that are to be transmitted by device 10 may be provided to baseband processor 52 from storage and processing circuitry 12 via path 89. Baseband processor 52 may be implemented using a single integrated circuit (e.g., a baseband processor integrated circuit) or using multiple integrated circuits. Baseband processor 52 may provide signals that are to be transmitted to transmitter circuitry within RF transceiver circuitry 54.

Transmitter circuitry in transceiver circuitry 54 may be coupled to power amplifier circuitry 56 via path 55. Transceiver circuitry 54 may receive control signals from storage and processing circuitry 12 via path 88 or from baseband processor 52 via path 91. These control signals may be used to control the power of the radio-frequency transmit signals TX that the transmitter circuitry within transceiver circuitry 54 supplies to the input of power amplifier circuitry 56 via path 55. This transmitted radio-frequency signal power level is sometimes referred to herein as $P_{IN}$, because it represents the input power to power amplifier circuitry 56.

Power amplifier circuitry 56 may receive control signals from storage and processing circuitry 12 via control path 76. Power amplifier circuitry 56 may optionally receive control signals from baseband processor 52 via the path indicated by dashed line 92. The control signals may be used to change the output power $P_{OUT}$ of signals supplied from power amplifier circuitry 56 to frontend circuitry 90. For example, power amplifier circuitry 56 may be placed into a high gain mode or a low gain mode and output at a different desired power level using control signals received from baseband processor 52 or storage and processing circuitry 12, or both. During data transmission, power amplifier circuitry 56 may boost the output power of transmitted signals to a sufficiently high level to ensure adequate signal transmission. Power amplifier circuitry 56 may receive bias voltages from adjustable power supply circuitry 78 via path 86.

Wireless circuitry 44 may include adjustable power supply circuitry such as adjustable power supply circuitry 78. Adjustable power supply circuitry 78 may be powered by voltage source 83. Voltage source 83 may be, for example, a battery such as battery 14 of FIG. 1. Voltage source 83 may supply a positive battery voltage to adjustable power supply circuitry 78 at positive power supply terminal 82 and may supply a ground voltage to adjustable power supply circuitry 78 at ground power supply terminal 84. Voltage source 83 may be implemented using a lithium ion battery, a lithium polymer battery, or a battery of any other suitable type.

Adjustable power supply circuitry 78 may be controlled by control signals received from storage and processing circuitry 12 via path 98. If desired, power supply circuitry 78 may be optionally controlled by control signals received from baseband processor 52 via optional path 94. These control signals may serve to adjust the power supply voltage $V_{DD}$ that is supplied by power supply circuitry 78 to power amplifier circuitry 56. For example, the control signals provided to power supply circuitry 78 may lower bias voltage $V_{DD}$ supplied to power amplifier circuitry 56 in order to increase the longevity of source 83. Increased longevity of source 83 may allow electronic device 10 to be used for longer periods of time.

Storage and processing circuitry 12 or baseband processor 52 may maintain a table of control settings to be used in controlling baseband processor 52, transceiver circuitry 54, power amplifier circuitry 56, and power supply circuitry 78. The control settings stored in the table may be calibrated control settings determined during calibration of electronic device 10. For example, the table may include a list of calibrated settings for each desired output power level of each frequency band that is used by electronic device 10. Each entry of the list may include a gain index (e.g., power amplifier input power adjustment settings), a power amplifier gain mode, a power supply voltage for the power amplifier, and other control settings to use for a desired output power level and a desired frequency band. Storage and processing circuitry 12 may generate appropriate control signals on path 98 (e.g., analog control voltages) based on the control settings stored in the table. The control settings may be generated during normal operation of device 10 (e.g., to transmit radio-frequency signals at a desired output power within a desired frequency band).

The value of bias voltage $V_{DD}$ that is used in powering radio-frequency power amplifier circuitry 56 can be reduced to conserve power. Care should be taken, however, to ensure that the bias voltage is not reduced too much. If $V_{DD}$ is reduced excessively, power amplifier circuitry 56 will not perform linearly and may exhibit clipping. If powered with $V_{DD}$ values that are so low as to induce clipping, wireless communications circuitry 44 may exhibit excessive non-linearity and may fail to meet expected performance criteria. For example, radio-frequency signals transmitted by circuitry 44 may exceed maximum levels of adjacent channel leakage ratio (ACLR). In situations such as these, power amplifier circuitry 56 is sometimes referred to as having insufficient "headroom" to perform its intended amplification function. If $V_{DD}$ is sufficiently large, power amplifier circuitry 56 will operate linearly and will not exhibit clipping.

Figure 3:
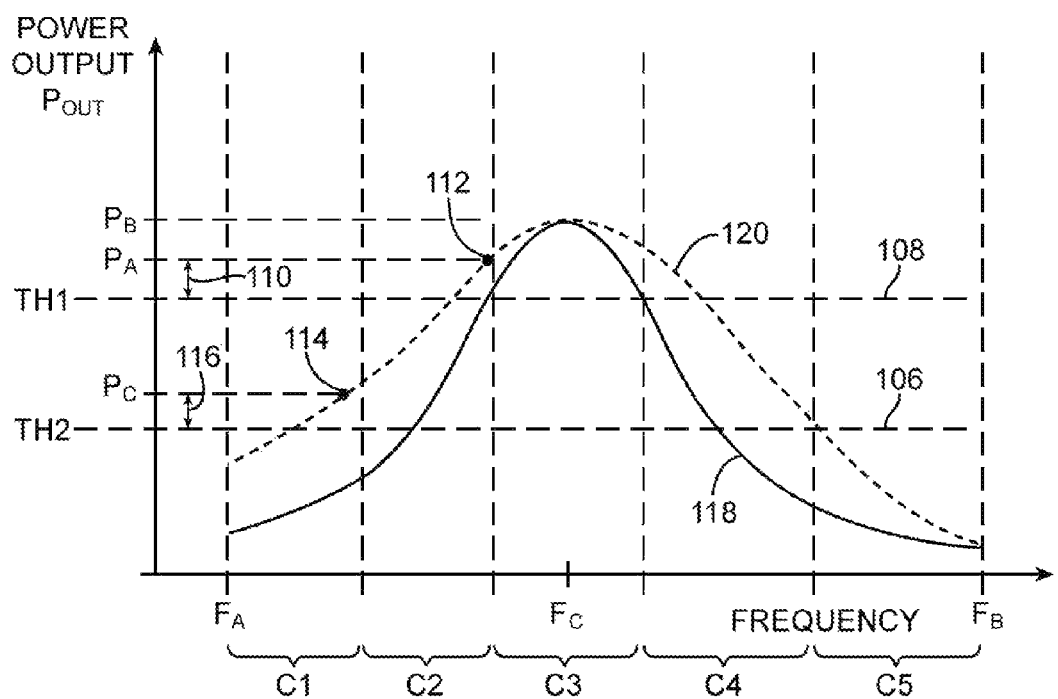
FIG. 3 is an illustrative graph showing how adjacent channel leakage ratio requirements may be satisfied by adjusting power amplifier supply voltage in accordance with an embodiment of the present invention.

A graph showing how transmitted output power $P_{OUT}$ may vary as a function of frequency is shown in FIG. 3. In the example of FIG. 3, device 10 is configured to transmit signals in a frequency channel C3 centered at frequency $F_C$. Communications channel C3 may, for example, be a code division multiple access (CMDA) frequency channel that includes a 5 MHz range of frequencies. Due to power amplifier non-linearity, device 10 may transmit signals with power in frequency channels outside of channel C3. Device 10 may transmit power in frequency channels C2 and C4 that are immediately adjacent to channel C3 (sometimes referred to herein as first adjacent frequency channels). Device 10 may also transmit power in frequency channels C1 and C5 that are separated from channel C3 by an intervening channel (e.g., channel C1 may be separated from channel C3 by intervening channels C2, whereas channel C5 may be separated from channel C3 by intervening channel C4). Channels C1 and C5 may be sometimes referred to herein as second adjacent frequency channels. Excessive power transmitted by device 10 in first and second adjacent frequency channels may indicate poor ACLR performance by power amplifier circuitry 56 in device 10.

The ACLR performance of power amplifier circuitry 56 in adjacent channels such as first adjacent frequency channels C2 and C4 and second adjacent frequency channels C1 and C5 may be subject to carrier-imposed requirements. In the example of FIG. 3, carrier-imposed requirements constrain device 10 to maintain output power in first adjacent frequency channels C2 and C4 below threshold TH1 (dashed line 108), whereas output power in second adjacent frequency channels C1 and C5 are required to remain below threshold TH2 (dashed line 106). Adjacent channel leakage ratio requirements in the second adjacent channel may be more stringent than requirements for the first adjacent channel. For example, threshold TH1 may be −33 dBm, whereas threshold TH2 may be −43 dBm. This example is merely illustrative. Thresholds TH1 and TH2 may be any desired value such as those determined by carrier requirements.

Curve 118 of FIG. 3 may characterize the performance of amplifier circuitry 56 that passes carrier-imposed ACLR requirements, such as those indicated by thresholds TH1 and TH2. Within the desired frequency channel (e.g., at frequency $F_C$), wireless circuitry 44 transmits signals at desired output power levels such as $P_B$. In first adjacent frequency channels C2 and C4, output power levels of curve 118 may be maintained below threshold TH1 (e.g., below −33 dBm). In second adjacent frequency channels C1 and C5, output power levels of curve 118 may be maintained below threshold TH2 (e.g., below −43 dBm).

Dashed curve 120 may characterize the performance of amplifier circuitry 56 in device 10 that fails carrier-imposed ACLR requirements. For example, power amplifier circuitry 56 may produce output signals having power $P_A$ in frequency channel C2 as shown by point 112. Output power $P_A$ may exceed threshold TH1 by margin 110 and fail ACLR requirements. Similarly, output power from power amplifier circuitry 56 may exceed threshold TH2 in second adjacent frequency channel C1 by a margin 116 as shown by point 114 on curve 120. Power amplifier circuitry 56 characterized by dashed line 120 fails the carrier-imposed ACLR requirements for the second adjacent frequency channel (e.g., channel C1) because the power level of point 114 in second adjacent frequency channel C1 has a power $P_C$ that is greater than second threshold requirement TH2. Power amplifier circuitry 56 may fail ACLR requirements in a first adjacent frequency channel, a second adjacent frequency channel, or both. As an example, power amplifier circuitry 56 may have unacceptable performance if power amplifier circuitry 56 fails ACLR requirements for only a single adjacent frequency channel (e.g., for channel C1, C2, C4, or C5).

Curve 118 may represent the performance of power amplifier circuitry 56 when provided with a sufficient bias voltage $V_{DD}$ by adjustable power supply circuitry 78 (FIG. 2). The bias voltage $V_{DD}$ may help to ensure sufficient linearity and acceptable ACLR performance of amplifier circuitry 56. Dashed curve 120 may represent the performance of power amplifier circuitry 56 when provided with an insufficient bias voltage $V_{DD}$ by adjustable power supply circuitry 78. As shown in FIG. 3, an insufficient bias voltage $V_{DD}$ may cause non-linearity in amplifier circuitry 56 and result in failure to meet ACLR requirements. However, a lower bias voltage $V_{DD}$ tends to reduce power consumption in device 10, which may increase the longevity of battery 83. The performance of device 10 may be optimized by finding suitable values of $V_{DD}$ for each desired output power level $P_{OUT}$ of power amplifier 56 in order to minimize power consumption while maintaining acceptable ACLR performance. Output power $P_{OUT}$ may, for example, be measured by test equipment to measure the power of signals transmitted by wireless circuitry 44 over a range of frequencies such as between frequency $F_A$ and frequency $F_E$. This range of frequencies may be associated with any suitable communications band (e.g., the transmission frequencies associated with a CDMA frequency band).

Figure 4:
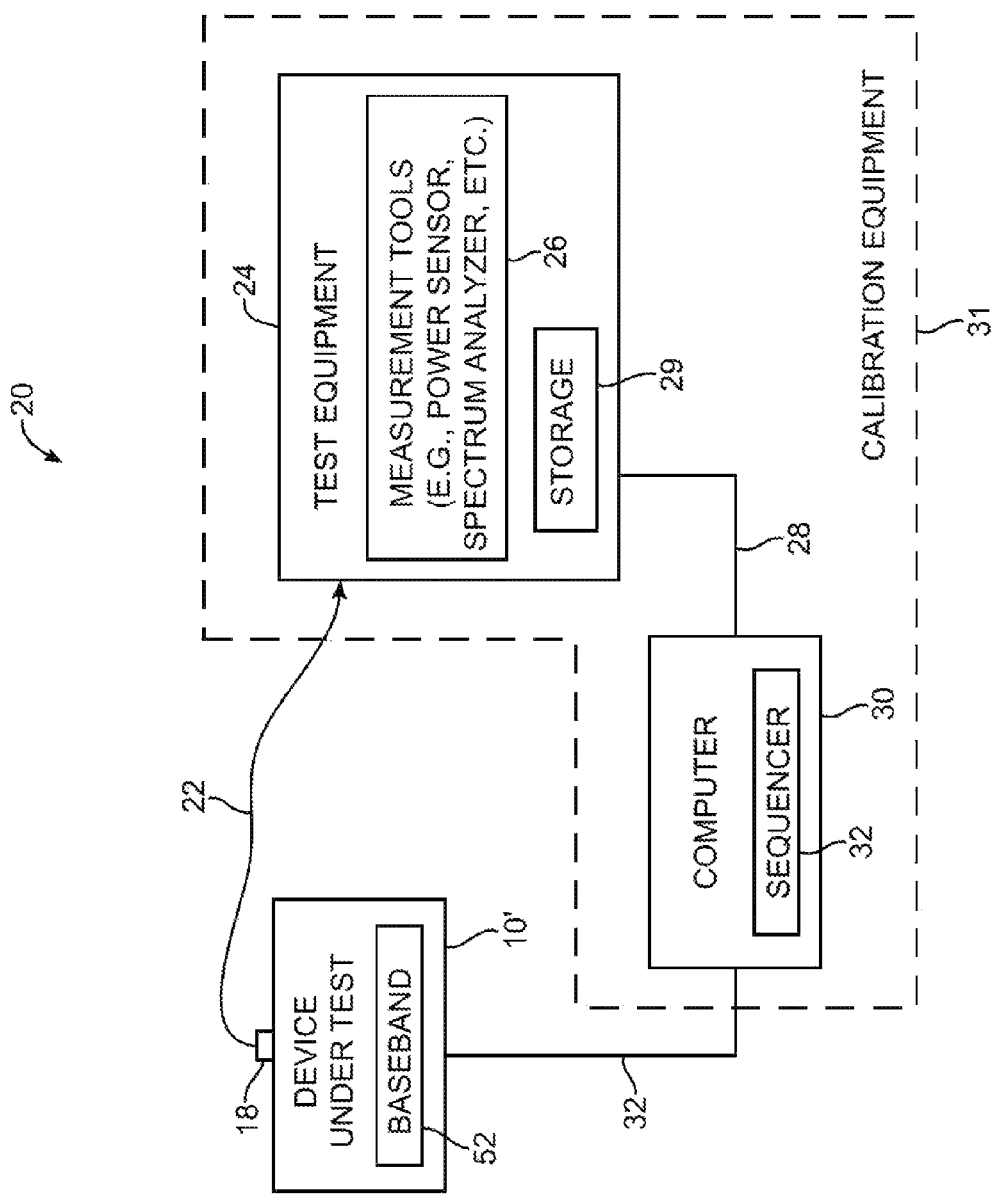
FIG. 4 is a diagram of an illustrative test system having test equipment and a computer for testing a wireless electronic device in accordance with an embodiment of the present invention.

Calibrated values of bias voltages $V_{DD}$ may be determined using a calibration test system during manufacturing. A calibration test system 20 that may be used to calibrate power amplifier circuitry on wireless electronic device 10 of the type shown in FIGS. 1 and 2 is shown in FIG. 4. As shown in FIG. 4, system 20 includes a device under test (DUT) 10' that may be coupled to calibration equipment 31. Calibration equipment 31 may include radio-frequency test equipment 24 and computing equipment 30. Device under test 10' may be, for example, an electronic device such as electronic device 10, or any other suitable device having wireless communication circuitry such as wireless communication circuitry 44. Device under test 10' may be coupled to radio communication testing equipment 24 via transmission line 22. Transmission line 22 may be coupled to connector 18 of DUT 10' (FIG. 2) to convey radio-frequency transmit signals supplied by power amplifier circuitry 56 to testing equipment 24. Testing equipment 24 may include measurement tools 26 that are used to measure various parameters of the radio-frequency signals provided by DUT 10'. For example, power measurement tools 26 may include a power sensor and/or a spectrum analyzer to measure the power $P_{OUT}$ of radio-frequency signals supplied by DUT 12 within one or more desired frequency channels. Testing equipment 24 may also include storage element 29. Storage element 29 may, for example, be used to store the measured powers received from DUT 12. Storage element 29 may include storage circuitry or other storage such as hard disk drive storage, nonvolatile memory (e.g., flash memory or other electrically-programmable-read-only memory configured to form a solid state drive), volatile memory (e.g., static or dynamic random-access-memory), etc.

When connected to cable 22, radio-frequency connector 18 may form an open circuit between the output of power amplifier 56 and antenna 62. At the same time, radio-frequency connector 18 may electrically connect the output of power amplifier circuitry 56 to transmission line 22. In this way, the signals transmitted and amplified by power amplifier circuitry 56 can be measured by test equipment 24. The example of FIG. 4 in which connector 18 and cable 22 are used to transmit signals from device under test (DUT) 10' to test equipment 24 is merely illustrative. If desired, test equipment 24 may perform tests on device 10' by measuring wireless signals transmitted from device 10' via antennas such as antennas 62 (FIG. 2).

Computing equipment such as computer 30 may be coupled to tester 24 via path 28. Computer 30 may also be coupled to DUT 10' via path 32. Computer 30 may be a desktop computer, laptop computer, tablet computer, portable handheld computer, or any other suitable computing equipment. Computer 30 may supply control signals to device 12 over path 28. Computer 30 may receive radio-frequency power measurements from test equipment 24 via path 28. For example, control signals provided by computer 30 may include a list of instructions for performing radio-frequency measurements.

During calibration of DUT 10', computer 30 may supply DUT control signals to DUT 10' via path 32. As an example, path 32 may be used to convey DUT control signals to storage and processing circuitry 12 of DUT 10' (FIG. 2). The DUT control signals may include instructions that direct wireless communications circuitry 44 in DUT 10' to begin transmitting radio-frequency signals over transmission line 22 and to produce radio-frequency signals using different parameters of wireless circuitry 44 such as bias voltages, desired output power levels, and gain settings. The DUT control signals may also be used to instruct baseband circuitry 52 to transmit signals in selected frequency channels. If desired, computer 30 and testing equipment 24 may be separate devices or, if desired, may be combined as a single device.

Measurement data taken by testing equipment 24 may be conveyed to computer 30 via line 28 for further processing. Computer 30 may process and analyze the measurement data to generate calibrated control settings for DUT 10'. For example, the calibrated control settings may include a list of optimized bias voltages $V_{DD}$ that reduce power consumption by DUT 10' while also satisfying adjacent channel leakage ratio requirements. The calibrated control settings generated by computer 30 may be conveyed to DUT 10' over path 32 to be stored in storage and processing circuitry 12. The calibrated control settings may be used by electronic device 10' to control wireless communications circuitry during normal operation.

In order to calibrate electronic devices such as electronic devices 10 and 10' in a time efficient manner, the electronic device and test equipment may be provided with a sequence of commands by the computing equipment. The sequence of commands may sometimes be referred to herein as a list mode sequence of instructions or a list mode sequence. Computer 30 may generate the list mode sequence of instructions using any suitable software. For example, the list mode sequence may be generated by sequencer 32. Sequencer 32 may generate a list mode sequence of instructions as a linked list data structure. The list mode sequence of instructions may include multiple commands to be processed in sequential order. Any suitable list of commands may be used by the list mode sequence of instructions. For example, the list mode sequence may include commands for calibrating bias voltages $V_{DD}$ to optimize power amplifier circuitry 56 while satisfying adjacent channel leakage ratio requirements. With one suitable arrangement, which is described herein as an example, calibration system 20 may use a list mode sequence such as that illustrated by table 124 of FIG. 5 in accordance with an embodiment of the invention. Table 124 may represent a list of instructions (commands) that is generated by computer 30 and supplied to test equipment 24 and DUT 10' during radio-frequency testing.

Each instruction (e.g., each entry) of table 124 may include desired wireless circuitry control settings. The control settings of each entry may include a desired output power, bias voltage $V_{DD}$, radio-frequency gain index (RGI), power amplifier gain mode, frequency channel for transmission, test length (test time), or other desired control settings.

DUT 10' may be provided with table 124 and process each entry of table 124. For example, storage and processing circuitry 12 may process entry 143 by controlling wireless circuitry 44 transmitting radio-frequency signals at output power $P_1$ in frequency channel C3, controlling adjustable power supply circuitry 78 to produce voltage bias $V_{DD1}$ that is supplied to amplifier circuitry 56, setting radio-frequency gain index of transceiver circuitry 54 to $RGI_1$, and controlling amplifier circuitry 56 to operate at a high gain mode HG. DUT 10' may transmit the radio-frequency signals using the settings of entry 143 for time $\Delta T_A$. After processing instruction 143, DUT 10' may process additional instructions of table 124 in order. For example, instruction 145 may be processed immediately after completion of instruction 143 by controlling wireless communications circuitry 44 to transmit signals using desired output power level $P_1$, voltage bias $V_{DD2}$, gain index $RGI_1$, high gain mode HG, centered in frequency channel C3, and for a duration of $\Delta T_A$.

This process may be repeated to sweep through any number N of possible bias voltages $V_{DD}$ for each desired output power level (e.g., for power level $P_1$, $P_2$, etc.). By sweeping through bias voltages $V_{DD}$ in this manner, wireless circuitry 44 may transmit signals using all desired bias voltages for a desired output power level $P_{OUT}$. In the example of FIG. 5, the instructions of list mode sequence 124 may include instructions for sweeping through bias voltages for additional power levels $P_2$ and $P_3$.

The example of FIG. 5 in which supply voltage $V_{DD}$ is swept is merely illustrative. If desired, the instructions in list mode sequence 124 may instruct DUT 10' to sweep through other parameters such as gain mode and gain index. In this way, radio-frequency signals may be transmitted using a range of configurations of amplifier circuitry 56 that are processed from a list mode sequence of commands received from computer 30 prior to testing.

List mode sequence 124 may be provided to test equipment 24. Test equipment 24 may process the instructions listed in list mode sequence 124 simultaneously with DUT 10' to perform measurements on the signals transmitted by DUT 10'. For each configuration of DUT 10' (i.e., for each instruction in table 124), test equipment 24 may measure signals transmitted by DUT 10' over transmission line 22. Multiple different measurements may be made during the assigned test duration of each instruction (e.g., test time $\Delta T_A$). Measurement tools 26 in test equipment 24 may measure output power in first and second adjacent channels in addition to output power in the channel in which DUT 10' is configured to transmit (e.g., measurement tools 26 may measure output power in channels C1, C2, C3, C4, and C5 of FIG. 3). Measurement tools 26 may, if desired, measure output power in any number of adjacent channels. Test equipment 24 may store the measurement data collected by measurement tools 26 in storage element 29. Measurement data stored in test equipment 24 may be retrieved by computer 30 after list mode sequence 124 has been completely processed.

Figure 6:
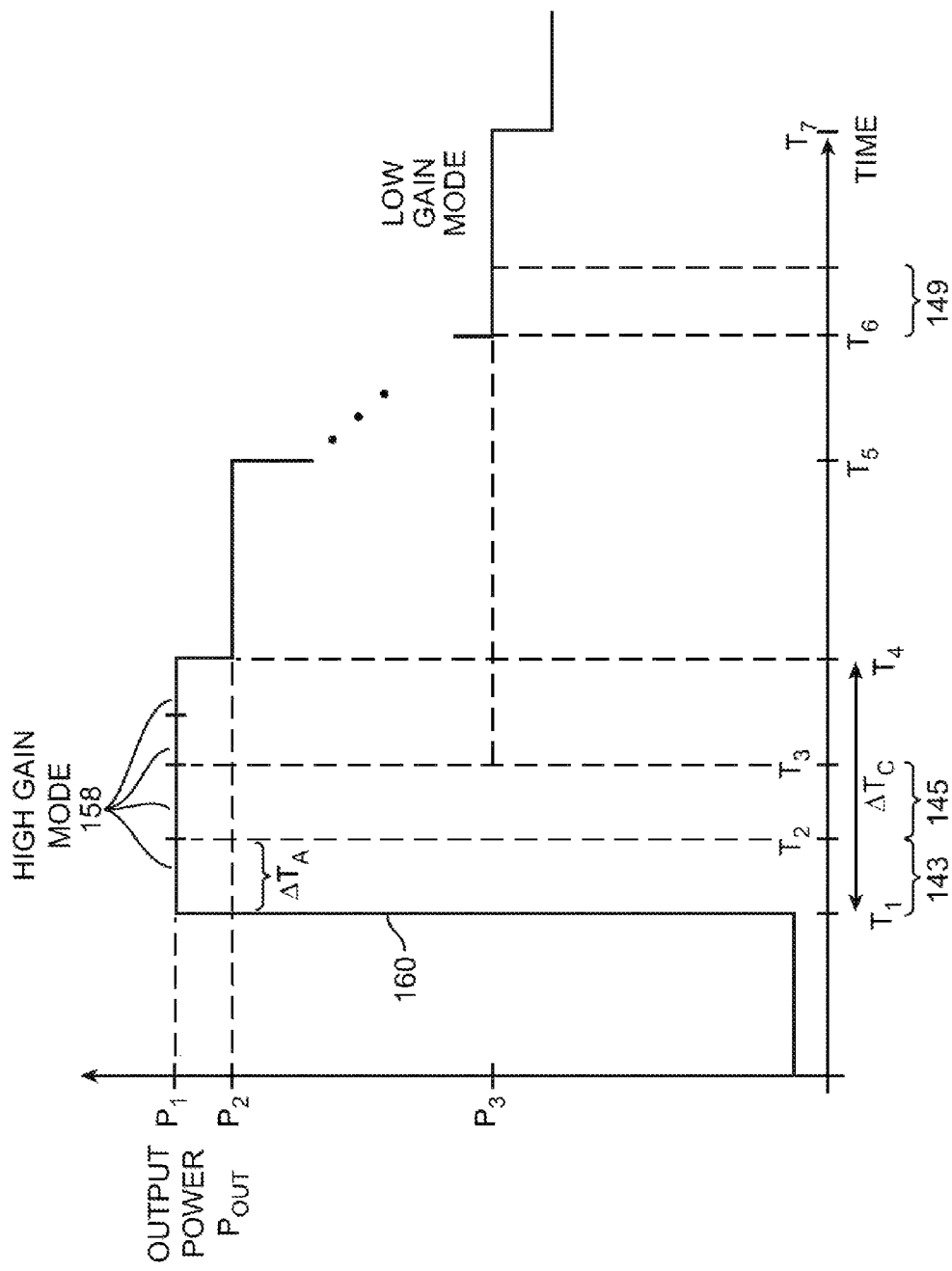
FIG. 6 is an illustrative graph showing how test operations may be performed over time by test equipment on radio-frequency signals produced by a device under test based on a sequence of commands in accordance with an embodiment of the present invention.

FIG. 6 is a diagram showing how measurements may be made on radio-frequency output from DUT 10' by test equipment based on a list mode sequence (e.g., list mode sequence 124 of FIG. 5). Curve 160 of FIG. 6 illustrates how output power $P_{OUT}$ that is measured by measurement tools 26 in a desired frequency band may change while list mode sequence 124 is processed by DUT 10'. At time $T_1$, DUT 10' may begin processing list mode sequence 124 and measurement tools 26 may measure the output power $P_{OUT}$ of signals received from DUT 10'. DUT 10' may process one row of list mode sequence 124 corresponding to each output power level $P_{OUT}$ for each segment 158 of curve 160. For example, between times $T_1$ and $T_2$, DUT 10' may process instruction 143 of list mode sequence 124 (e.g., power amplifier circuitry 56 in DUT 10' may be configured to output signals with a first desired output power $P_1$ using a power amplifier bias voltage $V_{DD1}$ and other control settings from instruction 143 for a duration $\Delta T_A$). Between times $T_2$ and $T_2$, power amplifier circuitry 56 may be configured to output signals with the first output power $P_1$ using a bias voltage $V_{DD2}$ for a duration $\Delta T_A$ (e.g., DUT 10' may process instruction 145). This process may be repeated using the N bias voltages corresponding to first desired output power level $P_1$, as indicated by list mode sequence 124, for the remaining segments 158. In the example of FIG. 6, list mode sequence 124 instructs DUT 10' to sweep four bias voltages between times $T_1$ and $T_4$ (e.g., curve 160 has four segments 158 corresponding to desired output power level $P_1$).

Measurement tools 26 may measure output power in any desired number of frequency channels in each segment 158 (e.g., between times $T_1$ and $T_2$, between times $T_2$ and $T_3$). Output power in the frequency channel identified by the instruction of list mode sequence 124 corresponding to each given segment may be measured as well as output power in adjacent frequency channels. For example, measurement tools 26 may measure output power in frequency channels C1, C2, C3, C4, and C5 between times $T_1$ and $T_2$ (e.g., five measurements may be made during segment 158 that corresponds to instruction 143).

In one suitable arrangement, measurement tools 26 measure output power $P_{OUT}$ for each frequency channel simultaneously. In another suitable arrangement, measurement tools 26 measure output power $P_{OUT}$ in each frequency channel sequentially. In this arrangement, measurement tools 26 measure output power in each frequency channel for a duration $\Delta T_B$ that is less than $\Delta T_A$. Duration $\Delta T_B$ may be selected to allow for all frequency channels to be measured in time $\Delta T_A$. For example, five frequency channels may be measured for a duration of one millisecond if signals corresponding to a selected bias voltage $V_{DD}$ are transmitted for five milliseconds (e.g., $\Delta T_B$ may be one millisecond when $\Delta T_A$ is five milliseconds and output power levels in five frequency channels are measured). This process may be repeated for each segment 158 on curve 160 corresponding to first output power level $P_1$ for a duration $\Delta T_C$.

Similar measurements may be performed by the test equipment between times T4 and T5 as DUT 10' transmits output signals with second desired output power $P_2$ (e.g., as DUT 10' sequentially processes list mode sequence 124). The test equipment may use the instructions of list mode sequence 124 to determine measurement timing. For example, the test time identified by each instruction may be used to determine when a subsequent set of measurements should be made based on the next instruction of list mode sequence 124. This process may be repeated any number of suitable times for each output power level $P_{OUT}$ in list mode sequence 124. At time T6, the desired output power $P_{OUT}$ may become sufficiently low for power amplifier circuitry 56 to be switched to low gain mode LG. After time T6, system 20 may continue to sweep through the power amplifier configurations as instructed by list mode sequence 124 with a low gain mode setting. These are merely illustrative examples. Any number of frequency channels may be measured for each instruction of the list mode sequence, any number of bias voltages $V_{DD}$ may be swept through by the list mode sequence, and any number of desired output power levels $P_{OUT}$ may be calibrated. Similarly, list mode sequence 124 may sweep through gain index or any suitable combination of the configurations indicated by the columns of list mode sequence table 124.

The measurements made by measurement tools 26 may be stored as measurement data in storage element 29 of test equipment 24. After list mode sequence 124 has been processed by DUT 10' and test equipment 24, computer 30 may retrieve the measurement data from test equipment 24 (e.g., from storage element 29). Computer 30 may generate calibration data by analyzing the measurement data to determine calibrated control settings such as power supply voltages $V_{DD}$ for DUT 10'. Computer 30 may use the output power measurements made for each row (instruction) of list mode sequence 124 in order to identify ACLR values for each desired output power level. Computer 30 may subsequently determine a minimum bias voltage $V_{DD}$ for which ACLR requirements are satisfied for each desired output power $P_{OUT}$ of DUT 10'. These calibrated supply voltages $V_{DD}$ may be conveyed to DUTs 10' to be stored as calibration data (e.g., calibrated control settings) in storage and processing circuitry 12. Storage and processing circuitry 12 may use the calibration data to control adjustable power supply circuitry 78 to provide optimized bias voltages $V_{DD}$ for each desired output power level during normal operation of device 10.

Figure 7:
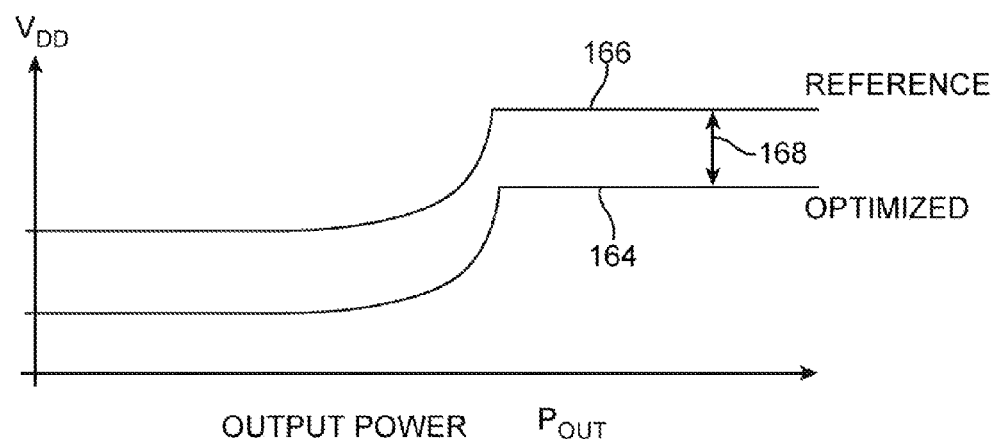
FIG. 7 is a graph showing how power amplifier supply voltage may be optimized as a function of output power in accordance with an embodiment of the present invention.

A graph showing how bias voltage $V_{DD}$ may vary as a function of output power Pout for optimized and reference control settings is shown in FIG. 7. Curve 166 represents reference control settings (e.g., control settings that have not been calibrated). Adjusting bias voltage $V_{DD}$ applied to amplifier circuitry 56 to follow curve 164 may allow device 10 to reduce bias voltage $V_{DD}$ by a margin 168 while ensuring that ACLR requirements are satisfied. An optimized device 10 that follows the trend of curve 164 will tend to consume less power than a device that follows the trend of curve 166, leading to greater longevity of battery 83 and longer use time for device 10.

Figure 8:
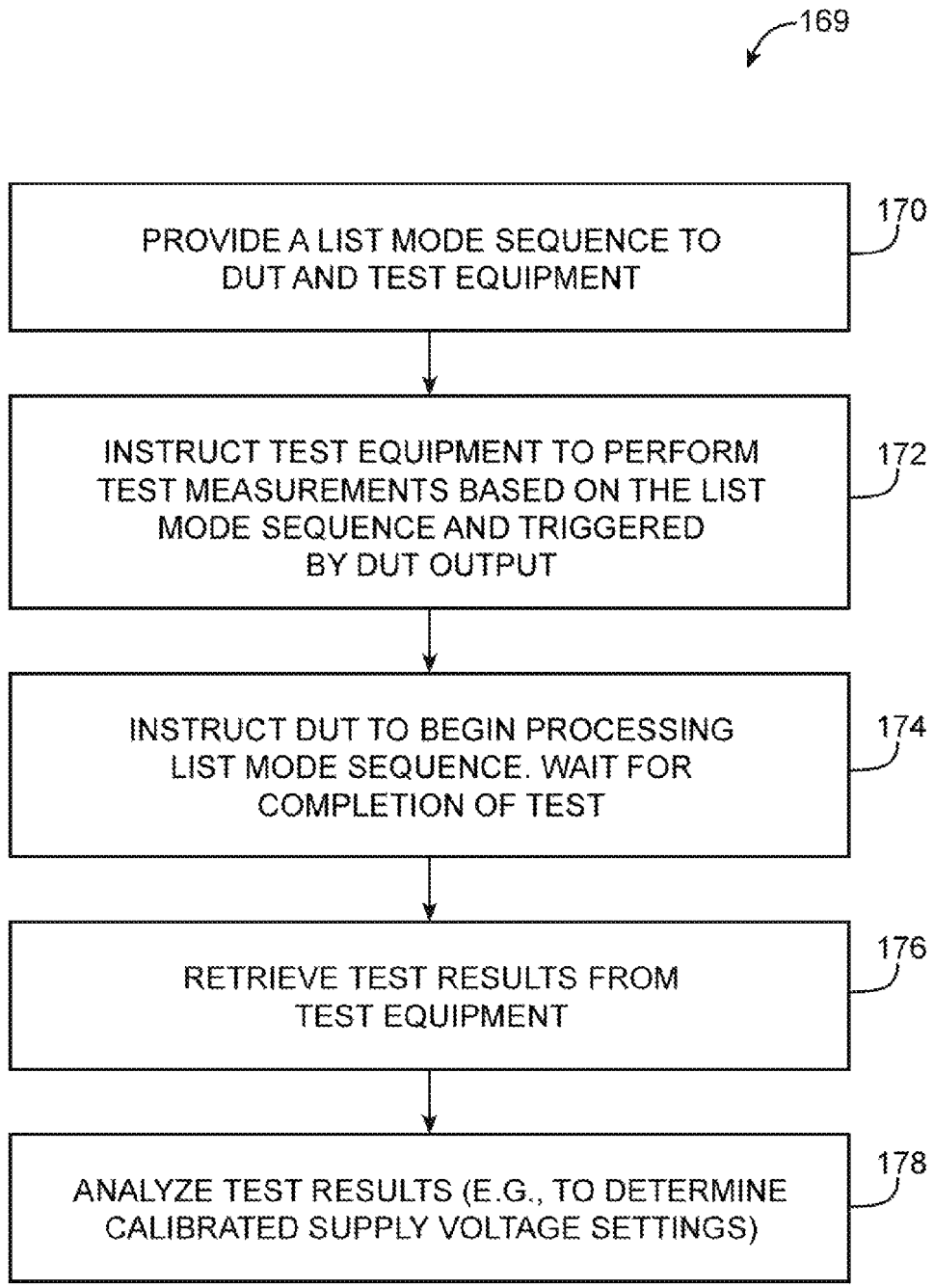
FIG. 8 is a flow chart of illustrative steps that may be performed by computing equipment to test an electronic device using test equipment and a sequence of commands in accordance with an embodiment of the present invention.

A flow chart 169 of illustrative steps involved in using computing equipment 30 of the type shown in FIG. 4 to calibrate DUT 10' using a list mode sequence of instructions is shown in FIG. 8.

At step 170, a list mode sequence of instructions such as list mode sequence 124 of FIG. 5 may be provided to DUT 10' (e.g., via control line 32) and to radio-frequency test equipment 24 (e.g., via line 28). The list mode sequence of commands may include multiple instructions each corresponding to a respective test configuration. The list mode sequence of instructions may be sent to DUT 10' and testing equipment 24 sequentially or in parallel.

At step 172, computer 30 instructs test equipment 24 to begin performing test measurements based on the instructions of the list mode sequence upon receiving signals from DUT 10'. In other words, test equipment 24 may be triggered to begin test measurements by initial reception of radio-frequency signals from DUT 10'. Computer 30 may also instruct test equipment 24 to measure output power $P_{OUT}$ of signals from DUT 10' in the frequency channel identified by each instruction of the list mode sequence, as well as in adjacent frequency channels (e.g., in frequency channels C1, C2, C3, C4, and C5 of FIG. 3).

At step 174, computer 30 provides control signals over line 32 that instruct DUT 10' to begin processing the list mode sequence of instructions. Computer 30 may then wait for DUT 10' and test equipment 24 to finish processing the list mode sequence of instructions.

At step 176, after test equipment 24 has finished measurements, computer 30 retrieves the test results (e.g., measurement data) from test equipment 24 via line 28. The measurement data may then be analyzed to determine appropriate calibration data for use in DUT 10 (step 178). For example, computer 30 may analyze the measured data to determine calibrated bias voltages $V_{DD}$ for each desired output power and each frequency channel that conserve power while maintaining ACLR requirements.

Figure 9:
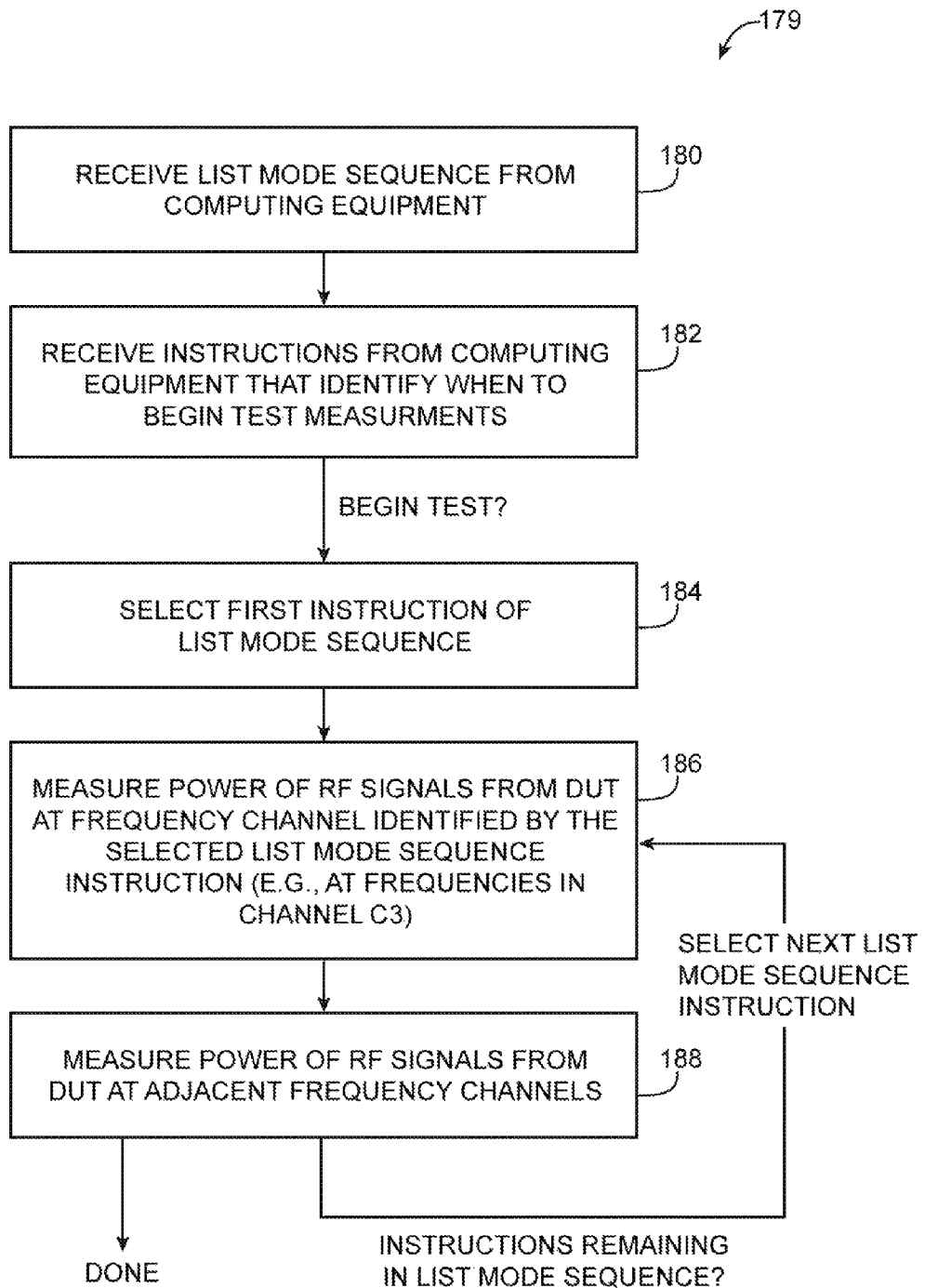
FIG. 9 is a flow chart of illustrative steps that may be performed by test equipment to perform adjacent channel leakage ratio measurements on a device under test based on a sequence of commands in accordance with an embodiment of the present invention.

A flow chart 179 of illustrative steps that may be performed to make calibrating radio-frequency signal power measurements on radio-frequency signals transmitted from DUT 10' using a list mode sequence of instructions is shown in FIG. 9. The steps of flow chart 179 may be performed using radio communication testing equipment such as radio-frequency testing equipment 24.

At step 180, test equipment 24 may receive a list mode sequence of commands. The list mode sequence may be received from computing equipment (e.g., from computer 30 via line 28). As an example, list mode sequence 124 of FIG. 5 may be received by test equipment 24.

At step 182, test equipment 24 may receive instructions from computer 30 that direct test equipment 24 to begin test measurements once signals are received from DUT 10' over transmission line 22. Test equipment 24 may also receive instructions from computer 30 to perform testing by measuring signals from DUT 10' in a frequency channel identified by the list mode sequence (e.g., in frequency channel C3 of FIG. 3) as well as in adjacent frequency channels (e.g., in frequency channels C1, C2, C4, and C5).

At step 184, once a signal is received from DUT 10' over line 22, test equipment 24 selects the first instruction of the list mode sequence for processing (e.g., instruction 143 of list mode sequence table 124 of FIG. 5).

At step 186, measurement tools 26 in test equipment 24 measure the output power of signals received on line 22 at frequencies in the frequency channel identified by the first instruction of the list mode sequence (e.g., at frequencies in channel C3 of FIG. 3 for instruction 143). Measurement circuitry 26 may measure output power for a duration $\Delta T_E$ in the selected frequency channel.

At step 188, measurement tools 26 in test equipment 24 measure the output power of the signals received from DUT 10' at frequency channels that are adjacent to the frequency channel identified by the list mode sequence instruction during step 186 (e.g., at frequency channels C1, C2, C4, and C5 of FIG. 3). The measured value for the output power in each frequency channel is then stored as measured data in storage element 29 of test equipment 24. The measured data may be labeled, tagged, or otherwise marked to identify the frequency channel at which output power was measured, as well as the corresponding instruction in the list mode sequence that produced the measured data.

If instructions remain in the list mode sequence (e.g., if there are instructions in list mode sequence table 124 that have not been processed), test equipment 24 may select the next list mode sequence instruction for processing and measurement. If each instruction has been processed, testing with test equipment 24 may be complete.

Figure 10:
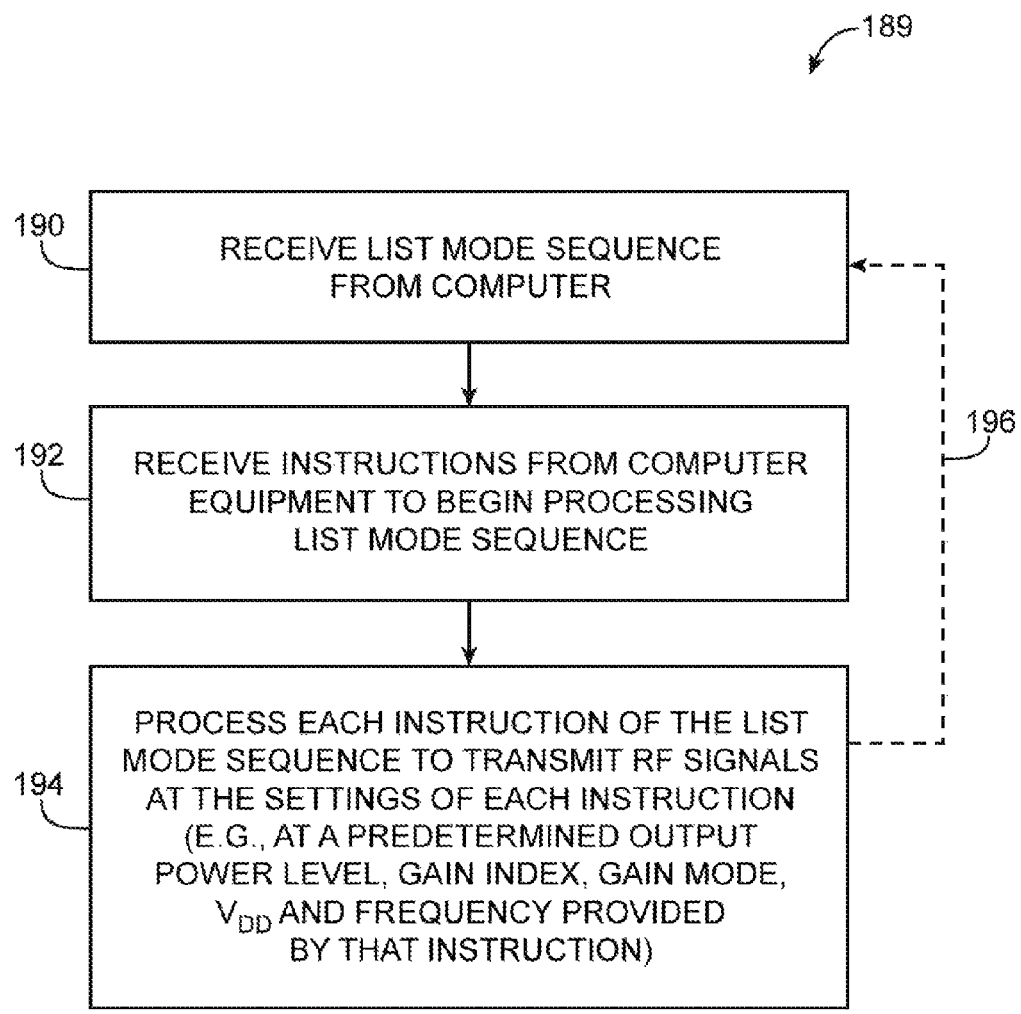
FIG. 10 is a flow chart of illustrative steps that may be performed by a device under test to process a sequence of instructions in accordance with an embodiment of the present invention.

A flow chart 189 of illustrative steps that may be performed by an electronic device under test such as DUT 10' to process a list mode sequence of instructions is shown in FIG. 10.

At step 190, DUT 10' may receive a list mode sequence of commands (e.g., from computing equipment such as computer 30 via line 32 of FIG. 4). The list mode sequence of commands may correspond to a number of configurations of wireless circuitry 44 in DUT 10' for transmitting radio-frequency signals such as those shown in table 124 of FIG. 5. DUT 10' may subsequently receive instructions from computer 30 to begin processing the list mode sequence of commands (step 192).

At step 194, DUT 10' processes each instruction of the list mode sequence of instructions to transmit radio-frequency signals using the configuration identified by each instruction (e.g., the control settings identified by each row of list mode sequence table 124 of FIG. 5). For example, each instruction in the list mode sequence of instructions may specify a predetermined output power level, gain index, power amplifier gain mode, bias voltage $V_{DD}$, and frequency channel in which to transmit signals. If desired, the process may return to step 190 via path 196 to process additional list mode sequences received from computing equipment.

Figure 11:
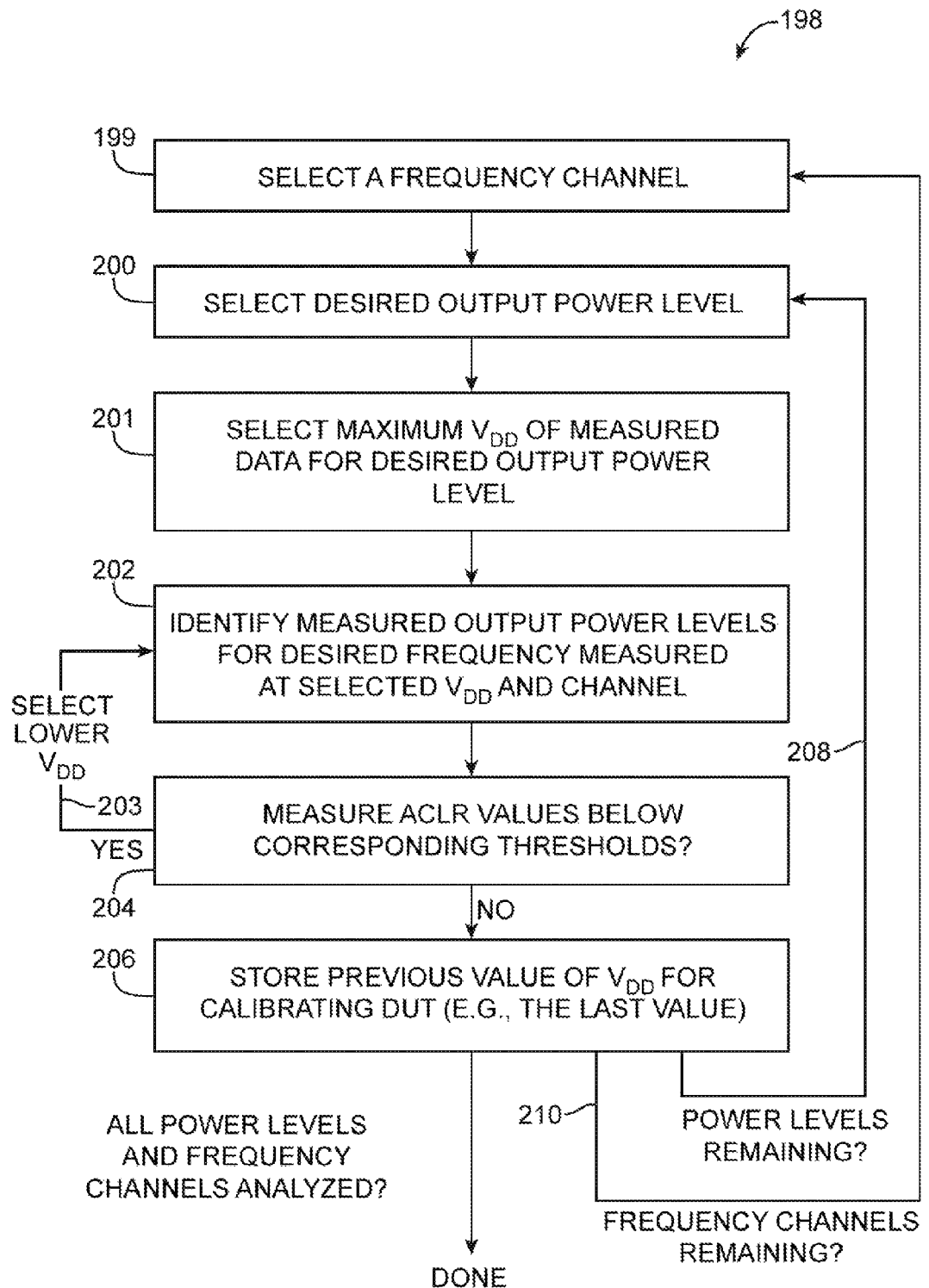
FIG. 11 is a flow chart of illustrative steps that may be performed by computing equipment generate calibration settings based on adjacent channel leakage ratio measurements in accordance with an embodiment of the present invention.

A flow chart 198 of illustrative steps that may be performed by computing equipment such as computer 30 to analyze measurement data is shown in FIG. 11. The steps of flow chart 198 may, for example, be performed as part of at step 178 of FIG. 9. These steps may be completed using computing equipment 30 after retrieving measurement data from testing equipment 24 that was created while testing DUT 10' (e.g., measurement data stored by the test equipment when processing the steps of FIG. 9). The measurement data may correspond to measurements made for each corresponding instruction in list mode sequence 124.

At step 199, computer 30 may select a frequency channel for calibration. At step 200, computer 30 may select a desired output power level $P_{OUT}$ (e.g., $P_1$, $P_2$, or $P_3$ of FIG. 6).

During the operations of step 201, computer 30 may select the maximum supply voltage $V_{DD}$ of the measured data for the selected output power level and frequency channel.

At step 202, computer 30 may identify the measured output power levels from testing the selected frequency channel, the selected output power level, and the selected power supply voltage. Consider the scenario in which frequency channel C3, output power level P1, and power supply voltage VDD1 are selected during steps 199-201. In this scenario, measured output power levels at output power level P1 and power supply voltage $V_{DD1}$ for frequency channel C3 and adjacent frequency channels C1, C2, C4, and C5 may be identified.

At step 204, the measured output power levels may be compared to corresponding threshold values. For example, threshold value TH1 may be compared to measured output power levels in frequency channels that are immediately adjacent to the desired frequency channel. As another example, threshold value TH2 may be compared to measured output power levels in second adjacent frequency channels. If the measured output power levels are less than the corresponding threshold values, computer 30 may select a reduced power supply voltage and return to step 202 via path 203.

If any of the measured output power levels exceed the corresponding threshold values (e.g., if the measured output power levels fail to satisfy ACLR requirements), computer 30 stores the previously selected power supply voltage as calibration data for DUT 10' at step 206 (e.g., the power supply voltage selected prior to the currently selected power supply voltage). The previously selected power supply voltage may represent a minimum power supply voltage that ensures adequate ACLR performance given the selected output power level and frequency channel. In this way, computer 30 may determine the lowest bias voltage $V_{DD}$ supplied to power amplifier circuitry 54 that still satisfies the imposed ACLR requirements.

The optimized power amplifier bias voltage (supply voltage) $V_{DD}$ may be stored in computer 30 until analysis is complete. Once an optimized bias voltage $V_{DD}$ has been stored, this process may be repeated for the remaining desired output power levels $P_{OUT}$ that were measured with testing equipment 24 by returning to step 200 via path 208 (e.g., all of the output power levels $P_{OUT}$ that were identified by the list mode sequence of instructions). If each power level for the selected channel has been processed, but frequency channels remain to be processed, the process may return to step 199 via path 210 to determine calibration data for the remaining channels. If each power level of each frequency channel has been processed, analysis may be complete and calibrated control settings may be provided to DUT 10'.

The example of FIG. 11 in which an optimal supply voltage $V_{DD}$ is found for a selected output power and frequency channel is merely illustrative. If desired, computing equipment 30 may calibrate other parameters such as gain mode, gain index, or any other parameter identified by the list mode sequence of instructions. For example, other parameters may be calibrated using computing equipment 30 and test equipment 24 by performing the steps of flow charts 169, 179, and 189 (e.g., by calibrating gain index instead of power supply voltage, etc.). In this way, calibrated control settings (e.g., optimal supply voltages $V_{DD}$) may be provided to DUT 10' for a range of desired configurations of wireless circuitry 44.

The foregoing is merely illustrative of the principles of this invention and various modifications can be made by those skilled in the art without departing from the scope and spirit of the invention.

What is claimed is:

1. A method of calibrating a wireless electronic device, the method comprising:
   with computing equipment, providing a message that contains a list of instructions to the wireless electronic device, wherein each instruction in the list includes control settings;
   with the computing equipment, directing the wireless electronic device to process each instruction in the list of instructions in the message after the wireless electronic device has received the message, wherein each instruction directs the wireless electronic device to transmit radio-frequency signals based on the control settings of that instruction; and
   with measuring equipment, measuring output power levels of the transmitted radio-frequency signals.

2. The method defined in claim 1 wherein directing the wireless electronic device to process the list of instructions comprises:
   directing the wireless electronic device to process the list of instructions in sequential order.

3. The method defined in claim 1, wherein the wireless electronic device comprises radio-frequency power amplifier circuitry configured to transmit the radio-frequency signals and adjustable power supply circuitry configured to provide an adjustable power supply voltage to the radio-frequency power amplifier circuitry, the method further comprising:
   with the computing equipment, determining a calibrated power supply voltage for the radio-frequency power amplifier circuitry based on the measured output power levels.

4. The method defined in claim 3 wherein each instruction of the list of instructions identifies a corresponding frequency channel and directs the wireless electronic device to transmit the radio-frequency signals in the identified frequency channel based on the control settings of that instruction.

5. The method defined in claim 4 wherein the control settings of each instruction identify a power supply voltage setting for the adjustable power supply circuitry.

6. The method defined in claim 3 further comprising:
   with the computing equipment, providing the message to the measuring equipment, wherein measuring the output power levels of the transmitted radio-frequency signals comprises measuring the output power levels of the transmitted radio-frequency signals based on each instruction of the list of instructions in the message.

7. The method defined in claim 6 wherein each instruction identifies a corresponding frequency channel and directs the wireless electronic device to transmit radio-frequency signals in the identified frequency channel based on the control settings of that instruction and wherein measuring the output power levels of the transmitted radio-frequency signals based on each instruction of the list of instructions comprises:
   measuring a first output power level for the identified frequency channel of that instruction; and
   measuring a second output power level for a frequency channel that is adjacent to the identified frequency channel of that instruction.

8. The method defined in claim 7 further comprising:
   with the computing equipment, determining whether the second output power level satisfies adjacent channel leakage ratio requirements.

9. The method defined in claim 8 wherein determining whether the second output power level satisfies the adjacent channel leakage ratio requirements comprises:
   determining whether the second output power level is less than an adjacent channel leakage ratio threshold level.

10. The method defined in claim 7 wherein measuring the output power levels of the transmitted radio-frequency signals based on each instruction of the list of instructions further comprises:
    measuring a third output power level for a frequency channel that is separated from the identified frequency channel of that instruction by the adjacent frequency channel.

11. A method of calibrating a wireless electronic device using a computer and test equipment, the method comprising:
    with the computer, providing an instruction list data structure having entries to the wireless electronic device, wherein each entry of the instruction list data structure includes control settings for the wireless electronic device;
    with the computer, providing the instruction list data structure to the test equipment;
    with the computer, providing a control signal to the wireless electronic device that instructs the wireless electronic device to process the instruction list data structure by transmitting radio-frequency signals based on the control settings of each entry of the instruction list data structure; and
    with the computer, instructing the test equipment to measure radio-frequency power levels of the transmitted radio-frequency signals based on the instruction list data structure.

12. The method defined in claim 11 further comprising:
    with the computer, determining calibration values for the wireless electronic device based on the measured radio-frequency power levels.

13. The method defined in claim 12 wherein the wireless electronic device includes power amplifier circuitry configured to transmit the radio-frequency signals, wherein the power amplifier circuitry is operable to receive a power supply voltage and wherein determining calibration values for the wireless electronic device based on the measured radio-frequency power levels comprises:
   determining calibrated power supply voltage settings for the power amplifier circuitry.

14. The method defined in claim 13 further comprising:
   with the computer, determining whether radio-frequency power level measurements have been performed by the test equipment for each entry in the instruction list data structure; and
   with the computer, retrieving measurement data from the radio-frequency power level measurements in response to determining that the radio-frequency power level measurements have been performed by the test equipment for each entry in the instruction list data structure.

15. The method defined in claim 11 wherein instructing the test equipment to measure the radio-frequency power levels of the transmitted radio-frequency signals based on the instruction list data structure comprises:
   instructing the test equipment to begin measuring the radio-frequency power levels upon receipt of radio-frequency signals from the wireless electronic device that are associated with an initial entry of the instruction list data structure.

16. The method defined in claim 11 wherein instructing the wireless electronic device to process the instruction list data structure by transmitting the radio-frequency signals based on the control settings of each entry of the instruction list data structure comprises:
   instructing the wireless electronic device to sequentially process the entries of the instruction list data structure.

17. The method defined in claim 11, wherein providing the control signal to the wireless electronic device comprises providing the control signal to the wireless electronic device after all of the instruction list data structure has been received by the wireless electronic device and wherein at least two entries in the instruction list data structure identify two different frequency channels for transmitting the radio-frequency signals with the wireless electronic device.

18. A method of calibrating a wireless electronic device using a calibration system including computing equipment and test equipment, the method comprising:
   with the computing equipment, providing the test equipment with a linked list data structure of instructions, wherein each instruction of the linked list data structure of instructions identifies a respective frequency channel; and
   with the test equipment, processing the linked list data structure of instructions in sequential order, wherein processing each instruction of the linked list data structure of instructions comprises:
      measuring a first output power level from the wireless electronic device in the respective frequency channel; and
      measuring a second output power level from the wireless electronic device in an adjacent frequency channel to the respective frequency channel.

19. The method defined in claim 18 wherein the test equipment includes storage circuitry and wherein processing each instruction of the linked list data structure of instructions further comprises:
   with the storage circuitry, storing output power level data including the first and second output power levels for that instruction.

20. The method defined in claim 19 further comprising:
   with the computing equipment, determining whether the test equipment has completed measurements for the first and second output power levels of each instruction of the linked list data structure of instructions; and
   with the computing equipment, retrieving the output power level data of each instruction of the linked list data structure of instructions from the test equipment in response to determining that the test equipment has completed measurements for the first and second output power levels of each instruction of the linked list data structure of instructions.

21. The method defined in claim 20 further comprising:
   with the computing equipment, determining calibration settings for the wireless electronic device by analyzing the retrieved output power level data of each instruction of the linked list data structure of instructions.

22. The method defined in claim 21 wherein analyzing the retrieved output power level data of each instruction of the linked list data structure of instructions comprises:
   identifying which instructions of the linked list data structure of instructions are associated with output power level data that satisfies adjacent channel leakage ratio requirements.

23. The method defined in claim 22 wherein each instruction of the linked list data structure of instructions corresponds to a respective wireless configuration of the wireless electronic device, the method further comprising:
   with the computing equipment, storing the wireless configurations of the identified instructions in the wireless electronic device as calibration data for use during normal operation of the wireless electronic device.

24. A method of calibrating a wireless electronic device using calibration equipment, wherein the wireless electronic device is operable to wirelessly communicate in a plurality of frequency channels, the method comprising:
   with the calibration equipment, providing the wireless electronic device with a list of instructions, wherein each instruction of the list directs the wireless electronic device to transmit radio-frequency signals in a selected frequency channel, wherein the list of instructions includes at least two instructions that direct the wireless electronic device to transmit the radio-frequency signals in two different frequency channels, and wherein the wireless electronic device waits until the at least two instructions are received from the calibration equipment before transmitting the radio-frequency signals;
   with the calibration equipment, measuring output power levels of the transmitted radio-frequency signals to obtain measurement data for each instruction of the list; and
   with the calibration equipment, analyzing the measurement data for each instruction of the list to determine calibration data for the wireless electronic device.

25. The method defined in claim 24, wherein analyzing the measurement data for each instruction of the list to determine calibration data for the wireless electronic device comprises:
   with the calibration equipment, identifying which instructions of the list are associated with measured output power levels that satisfy adjacent channel leakage ratio requirements.

26. The method defined in claim 25 wherein analyzing the measurement data for each instruction of the list to determine the calibration data for the wireless electronic device comprises:
  with the calibration equipment, determining the calibration data for the wireless electronic device based on the identified instructions that are associated with the measured output power levels that satisfy the adjacent channel leakage ratio requirements.

27. The method defined in claim 26 further comprising:
  with the calibration equipment, storing the calibration data in the wireless electronic device for use during normal operation of the wireless electronic device.

* * * * *